United States Patent [19]

Guzy

[11] Patent Number: 4,789,708

[45] Date of Patent: Dec. 6, 1988

[54] SYNTHETIC ELASTOMER WITH IMPROVED CHEMICAL, AGING AND OIL RESISTANCE

[75] Inventor: Raymond L. Guzy, Tulsa, Okla.

[73] Assignee: Hughes Tool Company, Houston, Tex.

[21] Appl. No.: 132,460

[22] Filed: Dec. 14, 1987

Related U.S. Application Data

[63] Continuation-in-part of Ser. No. 885,986, Jul. 15, 1986, abandoned.

[51] Int. Cl.$^4$ .................... C08F 279/00; C08L 23/16; C08L 23/26; C08L 9/00
[52] U.S. Cl. ................................ 525/263; 525/315; 525/268; 525/267; 525/243; 525/237; 525/211; 525/197; 525/194; 525/193; 524/483; 524/482
[58] Field of Search ............... 525/315, 197, 243, 194, 525/211, 237, 263; 524/483

[56] References Cited

U.S. PATENT DOCUMENTS

| | | | |
|---|---|---|---|
| 3,281,389 | 10/1966 | Hirshfield | 525/237 |
| 3,451,962 | 6/1969 | Auler et al. | 525/194 |
| 3,637,617 | 1/1972 | Wirth | 260/80.78 |
| 3,652,729 | 3/1972 | Brodaway | 260/878 |
| 3,678,135 | 7/1972 | Mastromatteo et al. | 260/889 |
| 3,699,071 | 10/1972 | Mills et al. | 260/33.6 AQ |
| 3,741,931 | 6/1973 | Martin et al. | 260/41.5 |
| 3,806,558 | 4/1974 | Fischer | 260/897 A |
| 3,827,991 | 8/1974 | Ando et al. | 525/315 |
| 3,878,153 | 4/1975 | Driscoll | 260/29.7 |
| 3,891,724 | 6/1975 | Yaeda et al. | 525/211 |
| 3,896,095 | 7/1975 | Morrissy | 260/80.78 |
| 3,919,133 | 11/1975 | Dawans et al. | 525/237 |
| 3,926,900 | 12/1975 | Guzy et al. | 260/33.6 |
| 4,153,765 | 5/1979 | Tsai | 526/48.1 |

FOREIGN PATENT DOCUMENTS 2209792  7/1974  France ................. 525/194

*Primary Examiner*—Carman J. Seccuro
*Attorney, Agent, or Firm*—Charles D. Gunter, Jr.

[57] ABSTRACT

Ethylene propylene copolymer elastomers and ethylene propylene diene terpolymer elastomers are shown which, when cured, exhibit improved oil resistance and chemical aging properties at elevated temperatures and pressures. A previously polymerized liquid 1,2-polybutadiene is incorporated into the elastomer by chemical blending during the polymerization process. Such compositions are useful as electrical insulating materials for use under extreme environmental conditions, particularly in wire and cable constructions.

6 Claims, 1 Drawing Sheet

SYNTHETIC ELASTOMER WITH IMPROVED CHEMICAL, AGING AND OIL RESISTANCE

BACKGROUND OF THE INVENTION

1. Cross Reference To Related Applications

This application is a continuation-in-part of my earlier filed application, Ser. No. 885,986, filed July 15, 1986, by the same title, abandoned as of the filing date of this application.

2. Field of the Invention

The present invention relates to improved synthetic elastomers made by incorporating polybutadiene with polyolefin rubbers, the resulting elastomers having improved chemical, aging and oil resistance properties, the polybutadiene being incorporated into the rubber by solvent blending.

3. Description of the Prior Art

Synthetic olefin polymers are popular as electrical insulating materials because of their ease of compounding, good extrudability and excellent electrical characteristics. These polymers also find use as valve seats, and in other applications. In particular, ethylene-propylene copolymer rubbers, known as EPR, and ethylene-propylene-nonconjugated diene terpolymer rubbers, known as EPDM have been widely employed as the primary insulating materials for electrical wire and cable. These materials have the characteristics of flowing and/or distorting at elevated temperatures and under extreme pressures and are sensitive to swelling and dissolving in various hydrocarbon solvents and oils. Where insulated wire and cable is needed for extreme conditions, EPR and EPDM elastomers have been physically blended with low molecular weight polybutadiene in a roll mill, Banbury mixer, or the like. The physical blending or incorporation of the polybutadiene into the EPR/EPDM rubber provides additional cure sites for greater cross link density. An increase in cross link density has been found to enhance the chemical aging and oil resistance of the elastomer, improving the performance of the elastomer in extreme environmental conditions. U.S. Pat. No. 3,926,900 to Guzy et al., issued Dec. 16, 1975, discusses the physical blending of liquid 1,2 polybutadiene with EPDM polymers.

The present invention has as its object an improved method for incorporating polybutadiene into EPR and EPDM, the incorporation of the polybutadiene occurring during the polymerization of the EPR/EPDM by chemically blending the polybutadiene in solution.

Another object of the present invention is the provision of an EPR/EPDM elastomer with a higher cross link density than previously possible to improve the oil resistance and chemical aging properties of the elastomer.

SUMMARY OF THE INVENTION

The synthetic elastomers of the invention have incorporated therein from about 11–50%, preferably from about 20–40%, of a liquid, high vinyl 1,2-polybutadiene resin having a pendant vinyl group for every other chain carbon which is capable of crosslinking to a very high degree. The preferred liquid, high vinyl 1,2 polybutadiene has from about 80–95 mole %, most preferably from about 90–95 mole % 1,2 vinyl structure.

In the method of the invention, the previously polymerized, liquid, high vinyl content 1,2-polybutadiene is incorporated into an elastomer selected from the group consisting of ethylene-propylene copolymer rubbers and ethylene-propylene-nonconjugated diene terpolymer rubbers. The previously polymerized liquid, high vinyl content 1,2-polybutadiene is incorporated during the polymerization of the elastomer to provide additional cure sites on the resulting elastomer. Rather than attempting to directly polymerize the polybutadiene onto the backbone of the ethylene-propylene chain, the polybutadiene is solution blended after catalysis and prior to separating and drying the polymerized elastomer. The polybutadiene is added prior to precipitating and drying the polymerized elastomer. The resulting elastomer is peroxide cured to produce an insulating material exhibiting excellent electrical characteristics, ease of compounding, and improved performance at extreme temperatures and pressures when exposed to solvents, oil and aqueous environments.

Additional objects, features and advantages will be apparent in the written description which follows.

DETAILED DESCRIPTION OF THE INVENTION

Figure 1:
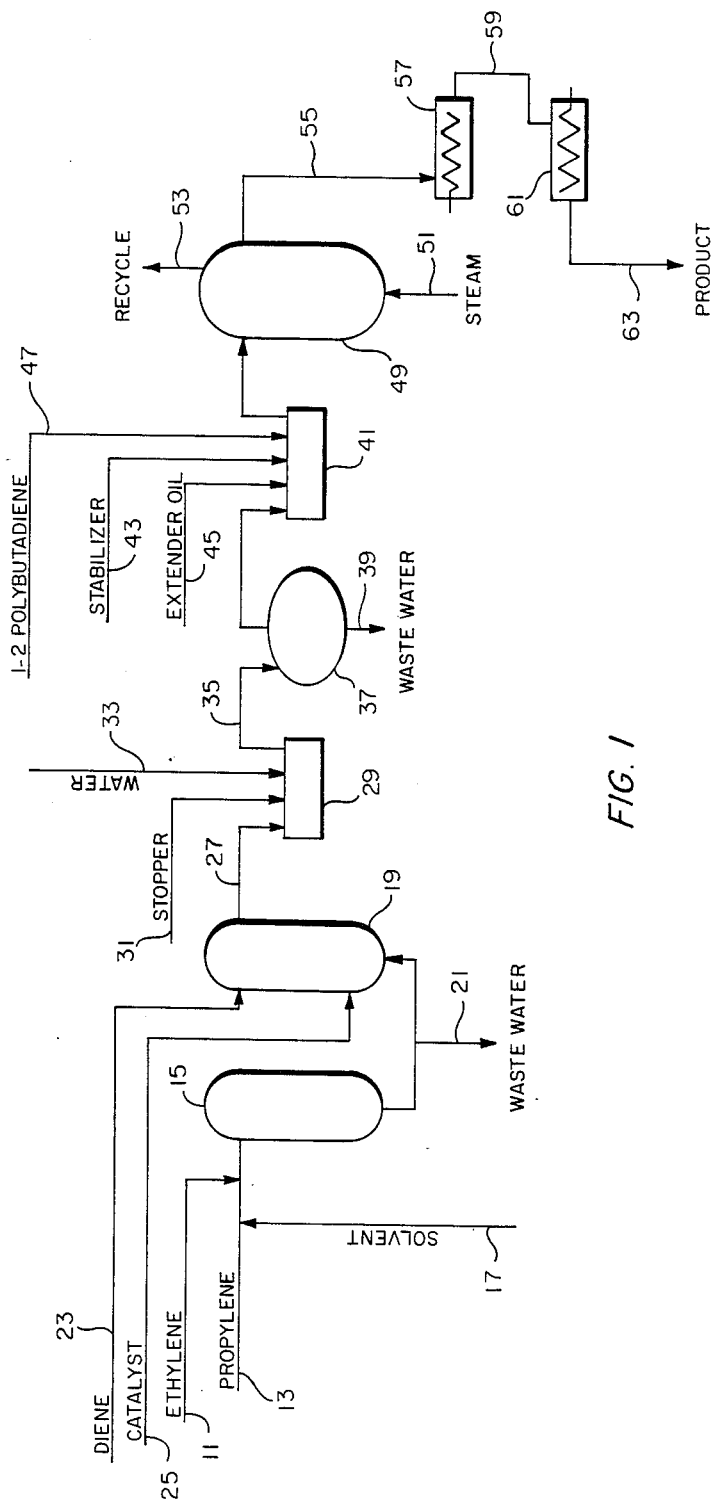
FIG. 1 is a schematic of the method used to produce the synthetic elastomers of the invention.

The synthetic elastomers of the invention are produced by incorporating a previously polymerized, liquid, 1,2-polybutadiene having a high vinyl content into an EPR/EPDM elastomer during the polymerization of the elastomer by addition of the polybutadiene to a solvent solution of the elastomer after the catalyzation step and prior to drying the elastomer. The preferred liquid 1,2-polybutadiene is characterized as a low molecular weight polymer of butadiene wherein greater than about 80 percent of the monomer units are present in the 1,2 configuration. A particularly preferred liquid 1,2-polybutadiene is a liquid, high vinyl 1,2 polybutadiene resin having a pendant vinyl group for every other chain carbon which is capable of crosslinking to a very high degree. The preferred 1,2-polybutadiene is a clear, amber colored, viscous liquid. Because of the viscous, sticky nature of the preferred polybutadiene, problems are encountered in the physical blending of the polybutadiene with the EPR or EPDM in a roll mill or Banbury mixer.

As is well known, 1,3-butadiene monomer can be polymerized by a variety of techniques to give polymers having a high proportion of units having 1,4 attachment in the cis and trans configuration:

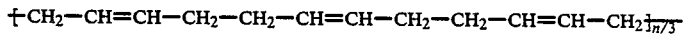

Certain commercial techniques based on anionic polymerization technology are also well known whereby the 1,3-butadiene monomer may be polymerized to give polymers having a high proportion of 1,2 attachment:

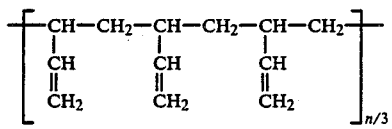

Such polymers can be produced in a variety of molecular weight ranges and with varying proportions of 1,2 to 1,4 units. For the purposes of this invention, those materials having molecular weights low enough to be liquid or semi-solid, when at room temperature and solvent free, and containing not less than about 80 mole percent units having 1,2 attachment, preferably not less than 90 mole percent units having 1,2 attachment, the remaining fraction being units with 1,4 attachment, are preferred. While the molecular weight of these materials may vary somewhat depending upon the proportion of 1,2 and 1,4 attachments and remain liquid, it has been found that the most desirable have molecular weights in the range from about 1,300 to 13,000, preferably from 1500 to 5000, with the most preferred molecular weight being about 3200. Although called liquid resins, many of these are extremely viscous and have a thick, honey-like consistency, the viscosity ranging from about 10,000–250,000 cps at room temperature. As a result, the liquid resins are truly pourable only when heated. A preferred material is manufactured by Colorado Chemical Specialties, Inc. of Golden, Colo., under the tradename "RICON 154" having 90-95 mole percent units having 1,2 attachment, a molecular weight of 3,200 and a viscosity of 250,000 cps at 45° C.

The EPR and EPDM materials which are polymerized in the method of the invention are well known in the art. Because of the presence of the diene monomer to provide cure sites, the EPDM material is preferred. The EPDM material is a terpolymer of ethylene with propylene and minor amounts of a nonconjugated diene monomer. In general, the ethylene monomer component normally ranges from 20 to 80 percent by weight and the propylene concentration from 80 to 20 percent by weight. The nonconjugated diene monomer is additionally employed in EPDM, the amount used being sufficient to provide curing sites, but not so great as to interfere seriously with the rubbery character of the product, i.e., in the range from about 2 to 20 percent by weight and preferably not greater than about 10 percent by weight of the total product. Typically, the diene monomer is a straight chain or cyclic diolefin such as 1,4-hexadiene, dicyclopentadiene, ethylidene norbornene and the like. The preferred EPDM materials are those containing from about 50 to about 80 percent ethylene and correspondingly from about 45 to about 15 percent propylene, the remaining proportion being diene monomer.

A description of EPDM rubbers and their preparation is contained in U.S. Pat. No. 3,637,617 to Wirth, issued Jan. 25, 1972. The following treatises also discuss the preparation of EPDM rubbers: "The Introduction to Rubber Technology," by M. Morton, Reinhold Publishing Corporation, New York (1959); "Synthetic Rubber Technology," Vol. I, by W. S. Penn, MacLaren and Sons, Ltd., London (1960); "Rubber, Fundamentals of its Science and Technology," by J. LeBras, Chemical Publishing Company, Inc., New York (1957); and Linear and Stereoregular Addition Polymers, by N. G. Gaylord et al., Interscience Publishers, New York (1959).

In the development of the method of the invention, laboratory experiments were performed in which a traditional EPDM elastomer was dissolved in a solvent, with the polybutadiene being added to the solvent solution. A masterbatch of an EPDM elastomer was prepared having the components shown in Table I. The masterbatch was mixed on a mill and three samples were obtained.

TABLE I
MASTERBATCH

| COMPONENTS OF MASTERBATCH | PARTS BY WEIGHT |
|---|---|
| EPDM (Oil Extended)[1] | 74. |
| EPDM[2] | 35. |
| Trimethylol-Propane-Trimeth-Acrylate | 3.3 |
| Catalyst[3] | 11. |

[1]EPsyn P-597 is an ethylene-propylene ENB-terpolymer extended with 100 phr paraffinic oil, having a sp. gr. of 0.87, a Mooney viscosity of 55, supplied by Copolymer Rubber and Chemical Corp., Baton Rouge, Louisiana.
[2]VISTALON 2504 is an EPDM terpolymer having a sp. gr. of 0.86, a Mooney viscosity of 35-45, supplied by Exxon Chemical Americas.
[3]Dicup 40 KE (dicumyl peroxide).

Sample #1

123.3 grams of the masterbatch was dissolved in Toluene.
28. grams of liquid 1,2-polybutadiene (RICON 154) was added to the solution and mixed well.
Entire mix was air dried for several days.
A slab was molded of the dried mix at 350 degrees F for 20 minutes.
Properties were taken of the slab (see Table II).

Sample #2

123.3 grams of the masterbatch was mixed on the mill.
28. grams of liquid 1,2-polybutadiene (RICON 154) was added to the masterbatch on the mill.
The mill mix was dissolved in Toluene.
Entire mix was air dried for several days.
A slab was molded of the dried mix at 350 degrees for 20 minutes.
Properties were taken of the slab (see Table II).

Sample #3

123.3 grams of the masterbatch was dissolved in Toluene.
No liquid 1,2-polybutadiene was added.
The entire mix was air dried for several days.
A slab was molded of the dried mix at 350 degrees F for 20 minutes.
Properties were taken of the slab (see Table II).

TABLE II

| Sample No. | Tensile × $10^3$ | Elongation % | Volume Change % |
|---|---|---|---|
| 1 | .93 | 100 | 86 |
| 2 | .36 | 80 | 103 |
| 3 | .27 | 300 | 195 |

The laboratory tests show that Sample #1 containing the liquid 1,2-polybutadiene added in solution has the highest property values and the lowest volume change in xylene. Sample #3 which has no polybutadiene, had the lowest properties and the most swell in xylene.

The above laboratory work led to the method of the invention in which the polybutadiene is incorporated into the EPDM polymer during the polymerization of the EPDM. The previously described references, including U.S. Pat. No. 3,637,617, the disclosure of which is hereby incorporated by reference, teach known methods for polymerizing EPDM elastomers. The polymerization is typically carried out in a solvent solution in the presence of a Ziegler type catalyst. The polymerization solvent can be any suitable inert or saturated hydrocarbon which is liquid and relatively nonviscous under reaction conditions. Examples of satisfactory hydrocarbon solvents include open chain saturated hydrocarbons containing 5–8 carbon atoms, as represented by hexane; aromatic hydrocarbons, preferably hydrocarbons containing a single benzene nucleus, such as benzene or toluene; and saturated cyclic hydrocarbons which have boiling ranges approximating those for the open chain and aromatic hydrocarbons described, and preferably saturated cyclic hydrocarbons containing five or six carbon atoms in the ring structure. The solvent can be a mixture of one or more of the foregoing hydrocarbons, such as a mixture of aliphatic and naphthenic hydrocarbons having approximately the same boiling range as hexane.

The Ziegler type catalyst is known to those skilled in the art and is described in U.S. Pat. No. 2,933,480, No. 3,093,620, No. 3,093,621, No. 3,211,709, and No. 3,113,115. Typical of such Ziegler type catalysts for use in the preparation of EPDM rubbers is a combination of vanadium compound and an alkyl aluminum halide, e.g., vanadium oxytrichloride and diisobutyl aluminum chloride.

The method of the invention is illustrated schematically in FIG. 1. Ethylene and propylene are introduced through lines 11,13 to pressure vessel 15, along with the solvent which enters through line 17. The resulting feedstock is introduced to pressurized reactor vessel 19 with waste gas being drawn off through line 21. Ethylidene norbornene and the vanadium catalyst are charged to the reactor vessel 19 through lines 23,25. The reaction product from the reactor vessel 19 is drawn off through line 27 and is passed to a shortstop tank 29 where the reaction is stopped and the catalyst deactivated by a stopper introduced through line 31. Water is also introduced to the shortstop tank 29 through line 33. The water slurry of the terpolymer is now passed through line 35 to tank 37 where waste water is removed through line 39. The slurry then passes to tank 41 where a stabilizer, extender oil and liquid, high vinyl content 1,2-polybutadiene are added through lines 43,45 and 47, respectively, for solution blending with the slurry of terpolymer. Unreacted monomers are removed by steam injection in tank 49, the steam entering through line 51 and the monomer strippings being recycled through line 53 back to the entry point. The water slurry of polymer now passes through line 55 to a dehydrating screw extruder 57. The output from the extruder 57 passes through line 59 to a drying screw extruder 61. The product passes out line 63.

The liquid 1,2-polybutadiene content of the resulting elastomers is preferably between about 11 to 50 weight percent based upon the weight of EPDM elastomer. Less than about 11 percent by weight polybutadiene results in elastomers which are considered too sensitive to hot oil, water and similar environments to be useful. Increasing the content of polybutadiene about 50 percent by weight results in elastomers having decreased flexibility. While the flexibility of the resulting material can be improved by other additives, it became uneconomical to offset this effect in elastomers containing higher levels of polybutadiene.

The resulting EPDM elastomer resulting from the solvent blending or addition of liquid polybutadiene during polymerization can be combined with traditional additives. For instance, although the above example utilized an oil-extender added to the polymer slurry in tank 41, the EPDM made by the method of the invention can be oil-extended in the traditional manner during compounding. Among the extending oils suitable for this purpose are naphthenic oils. The oil extension is accomplished by normal compounding techniques, including Banburying and roll milling. The proportion of EPDM to oil employed is normally in the ratio of about 2:3 to about 3:1.

A peroxide curing agent is added to the resulting elastomer to effect the necessary curing and cross linking of the compounded material. While sulfur-based curing systems have been employed in certain of the prior art EPDM formulations and for polybutadienes, such curing systems are not used in the preferred synthetic elastomers of the invention. The higher temperature peroxides, such as dicumyl peroxide and A, A'-bis(t-butylperoxy)-di-isopropyl benzene have been found to be particularly useful in the present invention in that the resulting cure is rapidly accomplished and complete. The amount of curing agent employed will normally be in the range of 1 to 8 percent, preferably about 2 to 6 percent by weight of the total composition.

The blending of the EPDM, oil and curing agent can be accomplished by any of the common rubber compounding methods, including roll milling and the like. Additional materials including lubricants, fillers, antioxidants and carbon blacks commonly employed in electrical insulating materials can also be added, either at this point or during a later compounding step. A cure co-agent can be added to effect rapid cure and more complete utilization of the peroxide. Among the co-agents which have been found useful are trimethylolpropane trimethacrylate and m-phenylene dimaleimide. Curing co-agent compounds are normally employed in amounts from about 1 to 5 percent, and preferably from 1 to 3 percent by weight of the total composition.

While the invention has been shown in only one of its forms, it is not thus limited but is susceptible to various changes and modifications without departing from the spirit thereof.

I claim:

1. A method of manufacturing a peroxide curable synthetic elastomer with improved chemical aging and oil resistance properties, comprising the steps of:

reacting ethylene, propylene and a diene monomer in a solvent solution in the presence of a suitable catalyst; forming a water slurry product of the resulting ethylene-propylene-nonconjugated diene monomer terpolymer; and solution blending a liquid, high vinyl 1,2-polybutadiene resin with the terpolymer product by adding the 1,2-polybutadiene to the slurry prior to separating and drying the terpolymer elastomer, the 1,2-polybutadiene having at least about 80 mole % 1,2 vinyl structure with a pendant vinyl group for every other chain carbon.

2. A method of manufacturing a peroxide curable synthetic elastomer with improved chemical aging and oil resistance properties, comprising the steps of:

reacting ethylene, propylene and a diene monomer in a solvent solution in the presence of a suitable catalyst to form an ethylene-propylene-nonconjugated diene monomer terpolymer;

stopping the reaction by deactivating the catalyst and forming water slurry product;

adding a liquid, high vinyl 1,2-polybutadiene resin to the slurry product to provide additional cure sites on the resulting elastomer, the 1,2-polybutadiene having at least about 80 mole % 1,2 vinyl structure with a pendant vinyl group for every other chain carbon; and separating and drying the elastomer.

3. A method of manufacturing a peroxide curable synthetic elastomer with improved chemical aging and oil resistance properties, comprising the steps of:

reacting ethylene, propylene and a diene monomer in a solvent solution in the presence of a suitable catalyst to form an ethylene-propylene-nonconjugated diene monomer terpolymer;

stopping the reaction by deactivating the catalyst;

adding water to the solvent solution containing the terpolymer to form a water slurry of the elastomer;

adding a liquid, high vinyl 1,2-polybutadiene resin to the slurry product to provide additional cure sites on the resulting elastomer, the 1,2-polybutadiene having at least about 80 mole % 1,2 vinyl structure with a pendant vinyl group for every other chain carbon; and separating and drying the resulting elastomer; and curing the elastomer with a peroxide curing agent.

4. A method of manufacturing a peroxide curable synthetic elastomer with improved chemical aging and oil resistance properties, comprising the steps of:

reacting ethylene, propylene and a diene monomer in a solvent solution in the presence of a vanadium catalyst to form an ethylenepropylene-nonconjugated diene monomer terpolymer, the terpolymer having an ethylene/propylene ratio in the range of 20/80 to 80/20 and from about 2 to 20 weight percent of the terpolymer of the nonconjugated diene monomer;

stopping the reaction by deactivating the catalyst;

adding water to the solvent solution containing the terpolymer to form a water slurry of the terpolymer;

adding a liquid, high vinyl 1,2-polybutadiene resin to the slurry product to provide additional cure sites on the resulting elastomer, the 1,2-polybutadiene having at least about 90 mole % 1,2 vinyl structure with a pendant vinyl group for every other chain carbon; and adding an extender oil to the slurry containing the terpolymer product;

separating and drying the resulting elastomer; and curing the elastomer with a peroxide curing agent.

5. The method of claim 4, wherein the high vinyl content 1,2-polybutadiene which is added to the slurry product has a viscosity ranging from about 10,000–250,000 CPS at room temperature.

6. The method of claim 5, wherein the high vinyl content 1,2-polybutadiene which is added to the slurry product has a viscosity of about 250,000 cps at 45° C.

* * * * *